March 21, 1961 R. MATHENEY 2,975,797
WATER SUPPLY MEANS FOR MOTOR CARS
Filed Sept. 12, 1957 2 Sheets-Sheet 1
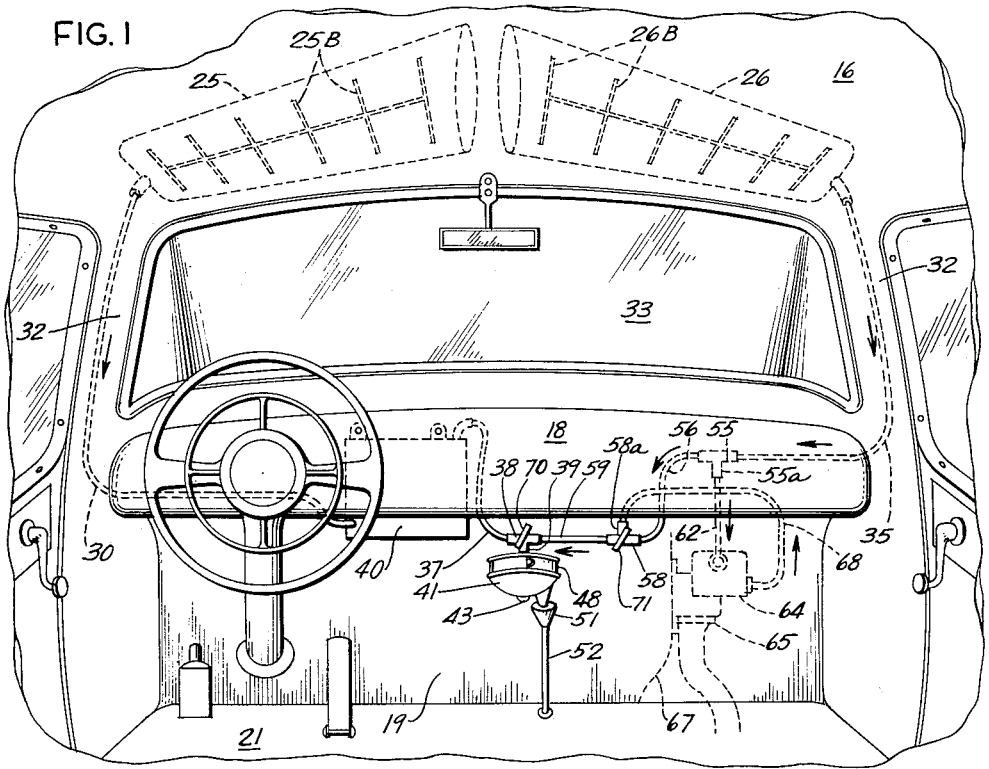
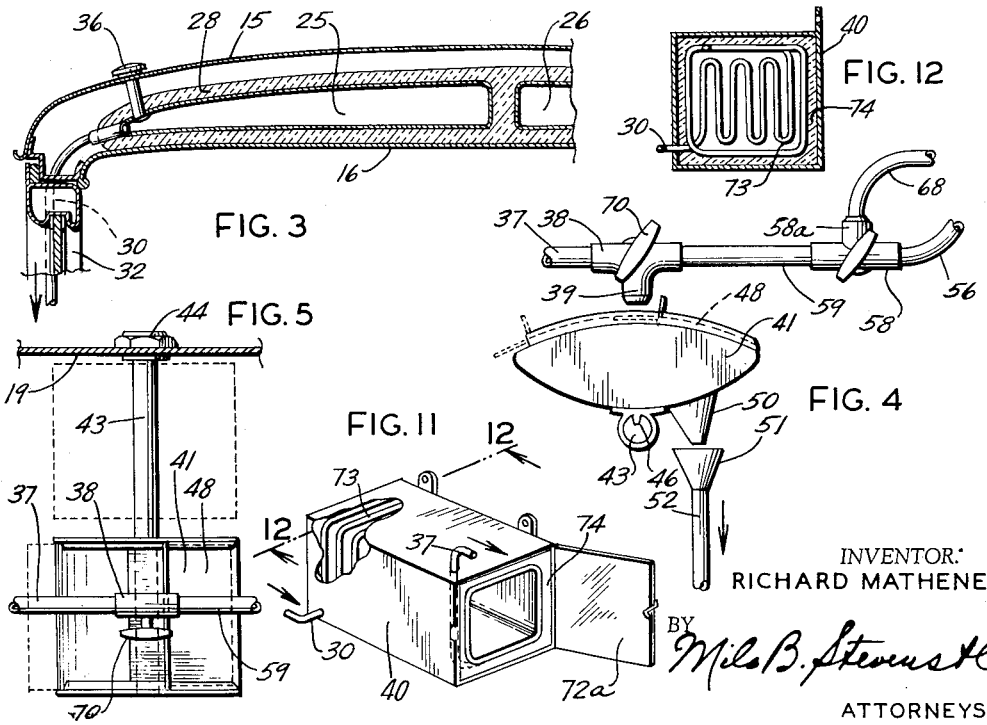
INVENTOR:
RICHARD MATHENEY
BY
ATTORNEYS.

March 21, 1961 R. MATHENEY 2,975,797
WATER SUPPLY MEANS FOR MOTOR CARS
Filed Sept. 12, 1957 2 Sheets-Sheet 2
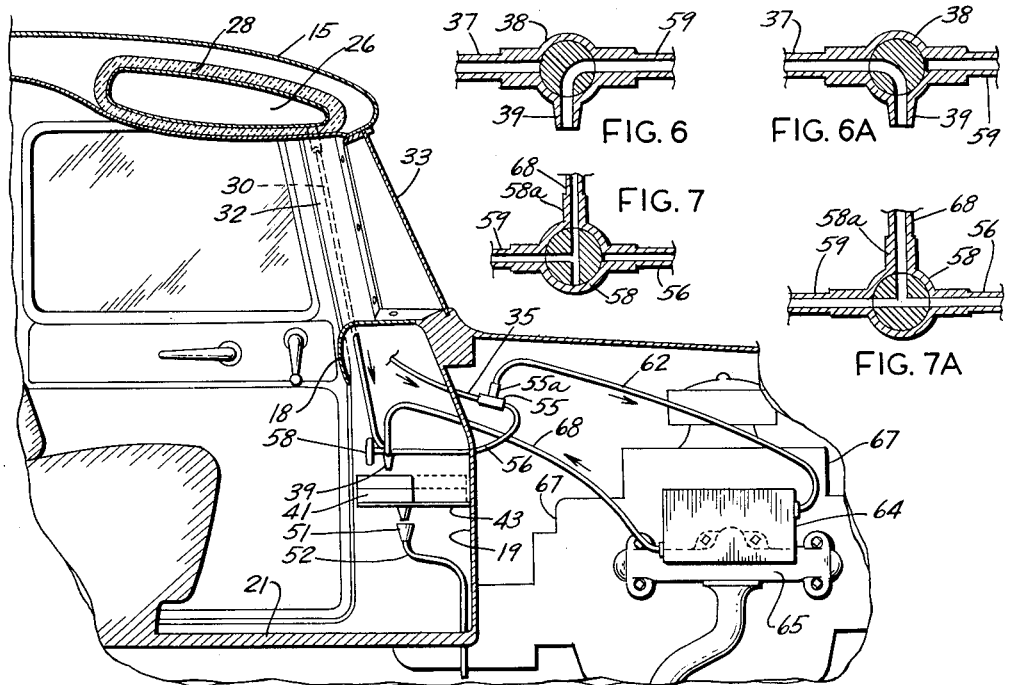
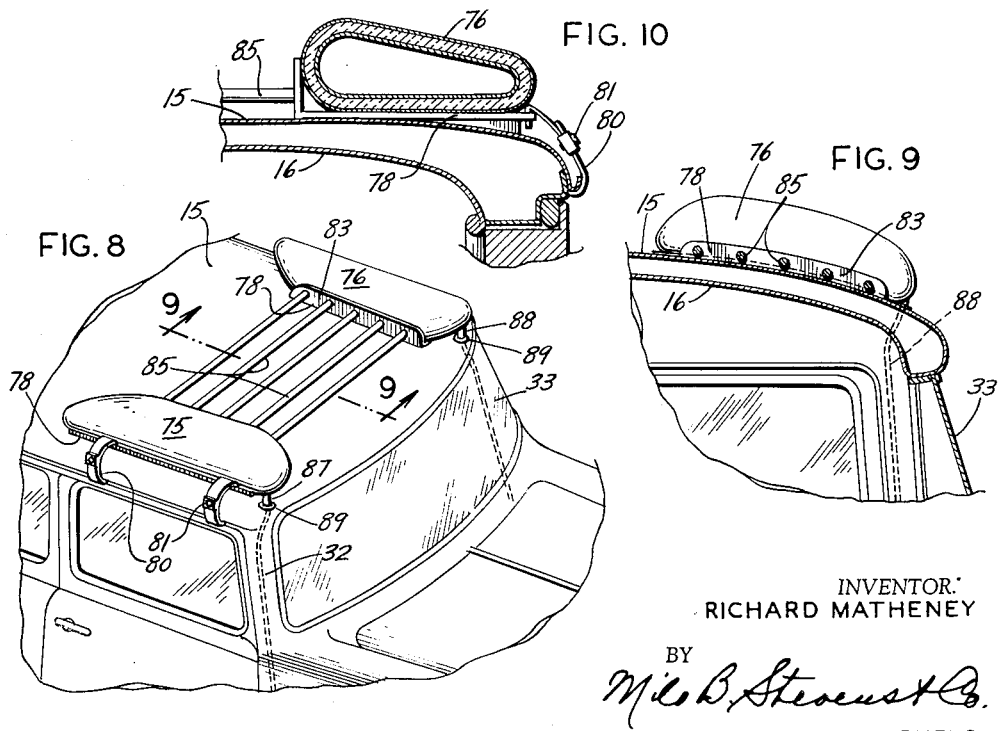
INVENTOR.
RICHARD MATHENEY
BY
ATTORNEYS.

United States Patent Office 2,975,797
Patented Mar. 21, 1961

2,975,797
WATER SUPPLY MEANS FOR MOTOR CARS
Richard Matheney, 233 W. 64th St., Los Angeles, Calif.
Filed Sept. 12, 1957, Ser. No. 683,649
2 Claims. (Cl. 137—334)

My invention relates to conveniences provided in motor cars for the use of passengers therein, and more particularly to the provision of water. Often, a family will travel over a long distance before a place is found where drinking water is available. Also, when food is served in picnic style, especially to children, it is desirable to have warm water for the washing of dishes and hands. It is therefore one object of the present invention to provide an installation in the motor car in which drinking water is available from one source and ordinary or tap water—hot or cold—is available from another source, both sources having a convenient dispensing facility underneath the dash of the motor car.

A further object is to design the water supply sources in the form of flat tanks, and to locate these in the region of the motor car top.

Another object is to lead conduits from the water supply tanks along or through the corner posts at the sides of the motor car windshield.

An additional object is to provide a handy washbasin conveniently located below the dash, the same discharging into a drain pipe which extends through the floor of the motor car.

A still further object is to utilize—in the preferred form of the invention—the frontal space between the motor car top and the lining thereof for the mounting of the water supply tanks, in order that these may not be visible after they have been installed.

Another object is to utilize the heat of the motor car engine for an auxiliary tank receiving the plain or tap water, so that such water may become heated for washing purposes.

With the above objects in view, a better understanding of the invention may be had by reference to the accompanying drawings, in which—

Fig. 1 is a view of the frontal space or compartment in the motor car, showing the novel installation by means of full and dotted lines;

Fig. 2 is a view from the right-hand side of Fig. 1 in section;

Fig. 3 is a section showing the installation of the drinking water tank and a portion of the plain water tank;

Fig. 4 is an elevation showing the valves and drain facilities;

Fig. 5 is a plan view of the washbasin, showing the manner of placing it in a remote position;

Figs. 6 and 6A are sections showing the different position of a valve for dispensing the drinking water;

Figs. 7 and 7A are similar views of a valve for controlling the plain water;

Fig. 8 is a perspective view of a modification showing the water supply tanks located externally over the motor car top;

Fig. 9 is a section on the line 9—9 of Fig. 8;

Fig. 10 is an enlarged section on the line 10—10 of Fig. 8;

Fig. 11 is a perspective view of a water chilling unit; and

Fig. 12 is a section on the line 12—12 of Fig. 11.

In accordance with the foregoing, specific reference to the drawings indicated the top of the motor car at 15, the lining thereof at 16, the dash at 18, the front wall of the passenger compartment at 19 and the floor at 21.

It will be noted, particularly from Fig. 3, that a pair of flat tanks 25 and 26 are located between the top 15 and lining 16, suitable padding or jacketing material 28 being employed to secure the tanks against vibration and lateral deviation. The tank 25 is designed to contain the drinking water, such as spring or distilled water; and a conduit for the supply of the water is shown at 30, such conduit extending through the correspondingly located corner post 32 of the motor car windshield 33. Thus, both the tank 25 and the conduit 30 are concealed from view. The tank 26 is constituted and reinforced similarly to the tank 25, such tank 26 serving to hold plain or tap water. Both tanks are also built with series of internal partitions 25B and 26B to divide the lateral water pressure when the car is rounding a curve. Fig. 1 indicates that a conduit 35 extends downwardly from the tank 26 through the corresponding corner post 32 for the supply of water from the tank 26. A suitable filler facility 36, such as shown in Fig. 3, may be provided for the water tanks.

In the space below the dash 18 is situated a dispensing valve 38 which is of the two-way type shown turned one way in Fig. 6 and turned the other way in Fig. 6A, the familiar form of plug valve being illustrated. This illustration is merely for purposes of example, as any other form of valve controlling the passage of water from the conuits 30 and 35 may be employed. The conduit 30 first connects with a coil-type chilling unit 40 and then extends with a continuation 37 to enter one end of the valve 38.

The valve 38 has a downspout 39 which discharges into a washbasin 41. Fig. 5 shows more clearly that the washbasin is mounted slidably on a horizontal rod 43 secured with its front end to the wall 19, as shown at 44. Thus, full lines in Fig. 5 show the washbasin in the position of use beneath the spout 39. However, when the use of the washbasin is no longer desired, it may be pushed back along the rod 43 to occupy the concealed position indicated by dotted lines in the same figure. In respect to the washbasin, it is noted in Fig. 4 that it is keyed at 46 to the rod 43 in order to keep from tilting sidewise. The washbasin has sliding covers 48 and a downspout 50 which drains into a funnel 51 at the top of the drainpipe 52, the latter discharging through the floor 21 of the motor car.

It will be noted, particularly in Fig. 1, that the supply pipe 35 from the tank 26 first enters a T-fitting 55 before continuing toward the dispensing valve 38. The conduit 35 enters one end of the T-fitting 55; and an extension 56 of the conduit 35 passes from the other end of the T-fitting 55 to one end of a mixing valve 58 shown in Figs. 7 and 7A. A pipe 59 passes from the other end of this valve to the other end of the dispensing valve 38.

It is now apparent that the conduit 35 and extension 56 lead plain water into the mixing valve 58, and that such water continues through the pipe 59 into the dispensing valve 38. However, the middle section 55a of the T-fitting 55 is employed to lead a branch conduit 62 to an auxiliary tank 64 attached in contact with the exhaust manifold 65 of the motor car engine 67. A discharge conduit 68 leads from the auxiliary tank to the middle section 58a of the mixing valve 58.

It is now apparent that plain water from the conduit 35 and extension 56 flows through the branch conduit 62 into the auxiliary tank 64 to be heated, such water then passing by way of the discharge conduit 68 into the mixing valve 58 from which it may pass by way of the pipe 59 into the dispensing valve 38. This valve has a handle 70, while the mixing valve 58 has a handle 71, such handles being used for limiting the water supply solely to the drinking water coming from the tank 25, or to cold water coming from the tank 26, or to hot water coming from the auxiliary tank 64, or to a suitable mixture of the cold and hot water.

The chilling unit 40 is shown more clearly in Fig. 11. In this unit the water circulates through a coil 73 lodged in an insulation jacket 74. The unit has a side door 72a for the insertion of a Dry-Ice pack into the coil.

Figs. 8 to 10 show a modification of the water tank installation. Thus, it is seen that the modified water tanks 75 and 76 are mounted on suitable base plates 78 secured on the motor car top 15, the plates being bound to the sides of the top overlapping straps 80 commonly used for luggage carriers. Such straps are adjustable by means of a bolt-and-nut fitting 81 or other suitable means; and the plates 78 are formed with flanges 83 and a series of cross-rods 85 between the tanks 75 and 76 to afford a luggage carrying facility. The supply conduits 87 and 88 are shown passing through suitable fittings 89 through the posts 32 of the motor car, as before.

It will now be apparent that the water supply installation described above is a facility which makes it convenient to serve drinking water or provide water for washing the hands or dishes while a family is enroute in the motor car and prefers picnic style service to stopping at roadside restaurants or washrooms. The preferred installation is compact by being largely contained within the top of the motor car; and the dispensing facilities under the dash may be grouped compactly, so that they will not interfere with the car controls or the comfort of the passengers.

While I have described the invention and its modification along specific lines, various minor changes or refinements may be made therein without departing from its principle, and I reserve the right to employ all such changes and refinements as may come within the scope and spirit of the appended claims.

I claim:

1. In a motor car having a top, a pair of transversely-spaced tanks contained in said top, one tank for drinking water and the other for plain water, a conduit descending from each tank into the cowl compartment of the motor car, a two-way dispensing valve receiving the conduit from the drinking water tank in one side, a pair of branches leading from the plain water conduit, a mixing valve receiving the free ends of the branches in inlets, and an outlet conduit leading from the mixing valve to the other side of the dispensing valve, one of said branches passing through a heating unit.

2. In a motor car having a top, a pair of transversely spaced tanks contained in said top, one tank for drinking water and the other for plain water, a conduit descending from each tank by way of the related corner post of the motor car into the cowl compartment of the motor car, a two-way dispensing valve receiving the conduit from the drinking water tank in one side, a pair of branches leading from the plain water conduit, a mixing valve receiving the free ends of the branches in inlets, and an outlet conduit leading from the mixing valve to the other side of the dispensing valve, one of said branches passing through a heating unit.

References Cited in the file of this patent

UNITED STATES PATENTS

| | | |
|---|---|---|
| 1,926,767 | Furniss | Sept. 12, 1933 |
| 2,050,381 | Rogers | Aug. 11, 1936 |